United States Patent [19]

Fisher et al.

[11] Patent Number: 5,203,632
[45] Date of Patent: Apr. 20, 1993

[54] GAS TURBINE PYROMETER FILTERING SYSTEM

[75] Inventors: Edward A. Fisher, Cincinnati; Keith L. Gehring, West Chester, both of Ohio

[73] Assignee: The United States of America as represented by the Secretary of the Air Force, Washington, D.C.

[21] Appl. No.: 874,323

[22] Filed: Apr. 24, 1992

[51] Int. Cl.$^5$ .................. G01K 13/08; G01J 5/62; G01J 5/08; G01J 5/10
[52] U.S. Cl. .................. 374/144; 374/128; 374/153; 356/43
[58] Field of Search .................. 374/144, 128, 153; 356/43

[56] References Cited

U.S. PATENT DOCUMENTS

| | | | |
|---|---|---|---|
| 3,623,368 | 11/1971 | Decker, Jr. | 374/144 |
| 3,742,191 | 6/1973 | Poole | 374/153 |
| 3,854,336 | 12/1974 | Bibby | 374/153 |
| 3,855,864 | 12/1974 | Douglas | 374/144 |
| 4,326,798 | 4/1982 | Kahn | 356/45 |
| 4,556,328 | 12/1985 | Orpet | 374/144 |
| 4,764,025 | 8/1988 | Jensen | 374/144 |
| 4,797,006 | 1/1989 | Masom | 374/130 |

FOREIGN PATENT DOCUMENTS

| | | | |
|---|---|---|---|
| 1480347 | 7/1977 | United Kingdom | 374/144 |
| 2130717 | 6/1984 | United Kingdom | 374/144 |
| 2133877 | 8/1984 | United Kingdom | 374/144 |

Primary Examiner—William A. Cuchlinski, Jr.
Assistant Examiner—Diego F. F. Gutierrez
Attorney, Agent, or Firm—Irwin Garfinkle; Donald J. Singer

[57] ABSTRACT

A gas turbine pyrometer filtering method and system uses a pyrometer to measure the high pressure turbine blade temperatures using infrared optical detection techniques. The pyrometer signal can be cluttered by positively biased noise. The turbine speed and the pyrometer electrical signal are alternately sampled by an analog to digital converter, and several revolutions of pyrometer data are stored in the local RAM. A data compression algorithm then selects single samples, at evenly spaced intervals, which results in a given number of revolutions, containing an exact number of data points of aligned data in RAM. This data is passed to a clutter rejection filter which then passes only the lowest value for each of the points in all revolutions of data. Thus, the revolutions of acquired data are reduced into a single revolution of filtered data for the current sampling. This single revolution of filtered data in then enter into a circular queue and the last element is discarded. The data is then passed through a second clutter rejection filter, and the output is a smooth temperature profile of the turbine blades, free of clutter.

7 Claims, 2 Drawing Sheets

GAS TURBINE PYROMETER FILTERING SYSTEM

STATEMENT OF GOVERNMENT INTEREST

The invention described herein may be manufactured and used by or for the Government for governmental purposes without the payment of any royalty thereon.

This invention is for a system for measuring the temperature of the rotating blades in a gas turbine engine in the presence of high, positively biased noise.

BACKGROUND OF THE INVENTION

Pyrometers are used in gas turbine engines to measure the high pressure turbine blade temperatures using infrared optical detection techniques. Because of the proximity of the gas turbine combustor to the leading edge of the high pressure turbine in a gas turbine engine, extremely hot gases exiting from the combustor create a pyrometer signal which is cluttered with positively biased noise. This unwanted noise is due to high frequency combustion transients (hot combustion products, e.g. carbon particles) passing in front of the pyrometer's field of view. The hot particles emit light in the same infrared spectrum to which the pyrometer is sensitive, but at a much higher intensity which tends to obscure the light emitted by the cooler turbine blades. At the upper power settings of the engine, the quality and frequency of the clutter is so dense that very few blades, if any, are visible on any single rotation. Thus, a method of acquiring the blade temperature data from the cluttered pyrometer signal is needed.

Known pyrometer signal averaging techniques (usually analog) used in the past are incapable of identifying individual blade temperature anomalies and tend to give erroneous high readings in the presence of positively biased clutter. This has the undesirable effect of unnecessarily reducing thrust at high power demand. This invention allows for detection of hot (clogged) and cold (broken) blades, and the clutter rejection algorithm which is used allows for determination of an unbiased average turbine temperature in the presence of positively biased clutter.

BACKGROUND OF THE INVENTION

Search of the prior art revealed the following United States Patents:

Mason U.S. Pat. No. 4,797,006, is directed to a pyrometer system in which a pyrometer provides output signals indicative of the temperature of the engine blades. The signals are received by a processor which includes a synchronization unit and a gate. After identifying the signals arising from radiation from the blades, the synchronization unit is set in synchronism with the blade signals, and the gate is controlled to interrupt signals arising from other sources, and pass only the signals arising from the blades.

Jensen U.S. Pat. No. 4,764,025 shows a pyrometer system which detects radiation reflected and emitted from the blades, and divides the radiation into two channels. Each channel detects radiation in different, but overlapping wavelength bands. The signal from on channel is weighted with respect to the signal from the other by a constant that is equal to the ratio of the radiation in the two channels which is attributable to the reflected radiation. The difference between the signal provides an output that is a function of blade temperature only.

Orpet U.S. Pat. No. 4,556,328 relates to a pyrometer system in which the pyrometer supplies signals to a detector unit with an inverter. The inverter inverts the signal and provides an output through a diode to one side of a capacitor, the other side of which is grounded. The charge on the capacitor follows the high value/low temperature signals, which are reinverted by a processing unit to given an averaged temperature indication. The diode is short circuited for periods equal to the blade rotational frequency causing the charge on the capacitor to drop to the instantaneous value of the pyrometer output, producing a low voltage, high temperature spike. The detector unit includes a store to which the spikes are supplied after reinversion, and the store produces a signal which follows the tips of the high temperature spikes.

Kahn U.S. Pat. No. 4,326,798 is directed to a pyrometer system for the measurement of the temperature of a primary source of heat which might be contaminated by radiation from a spurious source. The received radiation is separated into two spectral components, the second component of which comprises a higher proportion of the radiation emitted by the spurious source. The ration of, or the difference between the magnitudes of the two components is used to identify the presence of the spurious radiation.

Although each of the foregoing patents relate to pyrometer systems, they do not describe a system in which the clutter is removed by taking multiple samples of the temperature during each revolution of the turbine, and selecting the minimum value sample to provide an accurate profile of the turbine blade temperature over a period of several revolutions.

SUMMARY OF THE INVENTION

The invention uses a pyrometer to measure high pressure turbine blade temperatures cluttered with noise. The turbine speed and the pyrometer electrical signals are alternately sampled by an analog to digital converter, and several revolutions of pyrometer data are stored in the local RAM. A data compression algorithm then selects single samples, at evenly spaced intervals, which results in a given number of revolutions containing an exact number of data points aligned in RAM. This data is passed to a clutter rejection filter which then passes only the lowest value for each of the points in all the revolutions of data. Thus, the revolutions of acquired data are reduced into a single revolution of filtered data for the current sampling, resulting in a temperature profile for the blades. This single revolution of filtered data is then entered into a circular queue and the last element is discarded. The data may then pass through a second clutter rejection filter (not shown) and the output is a smooth temperature profile of the turbine blades, free of clutter.

OBJECTS OF THE INVENTION

It is the primary object of this invention to provide a means and a method of acquiring the blade temperature data from a pyrometer signal which is cluttered with positively biased noise.

Another object of this invention is to provide a clutter filtering system which eliminate positively biased noise from a pyrometer signal acquired for determining the temperature of the blades of a high pressure turbine in a gas turbine engine.

Still another object of this invention is to provide a temperature measurement of the temperature of the rotating blades of a gas turbine engine.

Still another object of this invention is to measure the temperature of the rotating blades of a high pressure turbine through which hot combustion gases are flowing and obscuring the pyrometer signal received from the blades.

Yet another object of this invention is to derive the temperature of the rotating blades of a high pressure turbine in the presence of extremely hot combustion gases which produce positively biased clutter noise, and to provide means and method for removing such noise.

BRIEF DESCRIPTION OF THE DRAWINGS

For further objects and advantages of this invention, reference should now be made to the following detailed specification and to the accompanying drawing in which.

DESCRIPTION OF THE PREFERRED EMBODIMENT

This invention was developed specifically for an engine designed for the United States Air Force, but the method and system for filtering clutter from the pyrometer system has general application.

Figure 1:
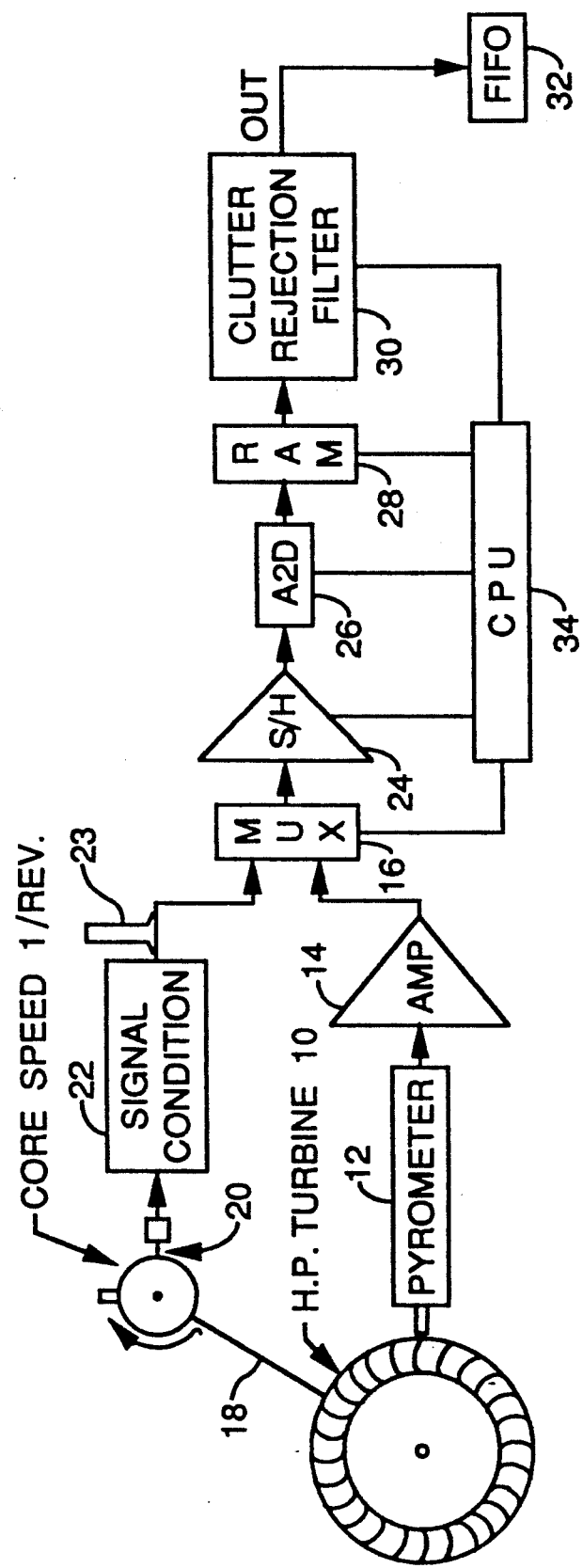
FIG. 1 illustrates a preferred embodiment of the invention.

The means and method of this invention are illustrated in FIG. 1, to which reference should now be made. The purpose of the invention is to measure the temperature of the blades of the high pressure turbine 10 of a gas turbine engine (not shown). A conventional pyrometer 12, using conventional infrared optical detection techniques, generates an analog electrical signal which is amplified in an amplifier 14. The output from the amplifier 14 provides a first input to a multiplexer 16.

A shaft 18 coupled to the turbine 10 drives a generator 20 which produces a single pulse 23 for each revolution of the turbine. The train of pulses generated by the generator 20 is applied to the second input of the multiplexer 16 through a signal conditioner 22 which serves to amplify and shape the pulses.

The multiplexer 16 now contains a continuous flow of analog pyrometer signals along with the pulses 23 from the generator 20. The output of the multiplexer 16 is applied to a sample and hold circuit 24 in which the analog signals are sampled at a very high rate. The analog output of the sample and hold circuit is then converted to digital data in an analog to digital converter 26, after which it is stored in a ram 28.

Figure 2:
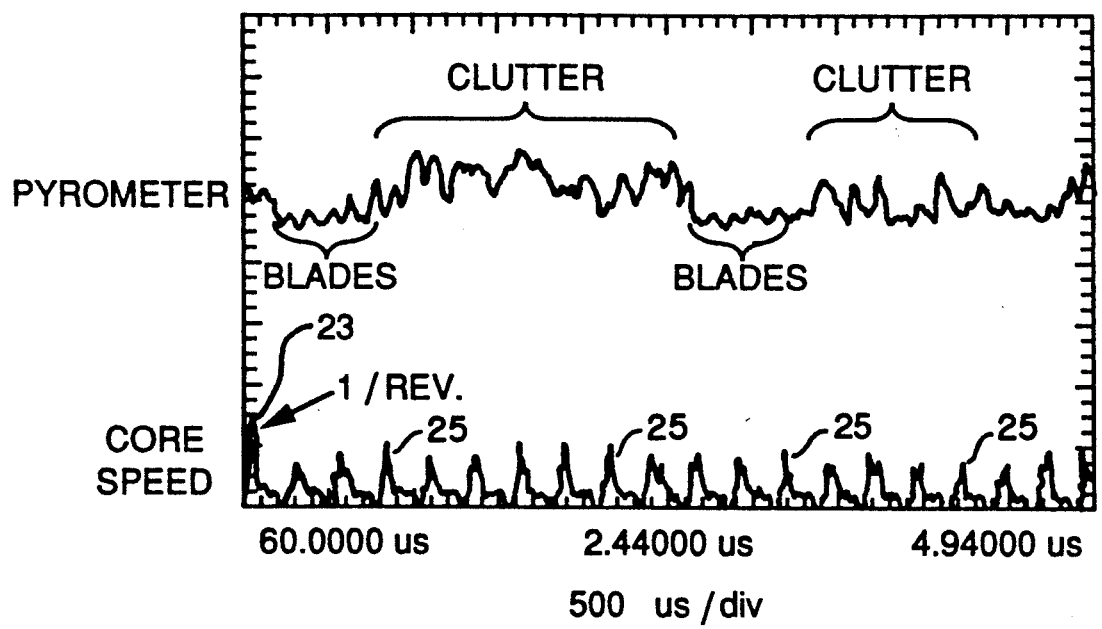
FIG. 2 illustrates the clutter (noise) in a typical pyrometer signal during a single revolution of the turbine.
Figure 3:
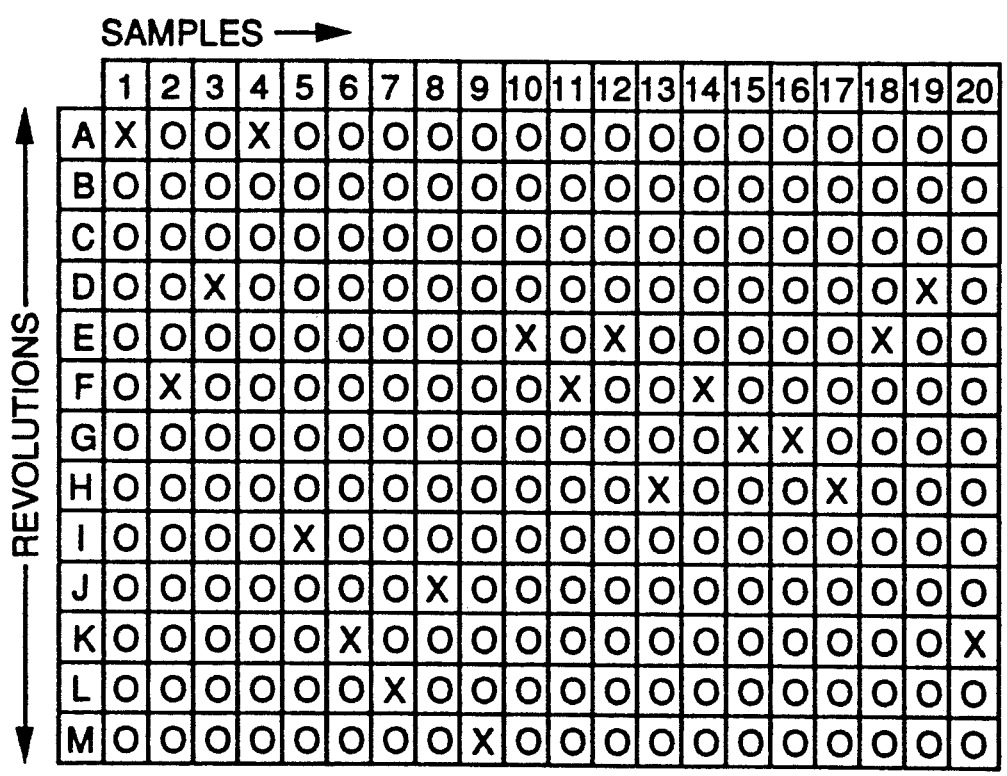
FIG. 3 is a chart showing the alignment of the data for selection by the noise filter.

The object at this point is to process the signals acquired over a predetermined number of revolutions M of the turbine 10. The generated pyrometer signals for a single revolution of the turbine 10 is shown in FIG. 2. It is noted that the pyrometer signals contains both the desired blade temperature information and the much higher undesired clutter. Also illustrated in FIG. 2 is the single pulse 23 representing the generator 20 output for a single revolution of the turbine, and the pulses 25 represent the sample periods. Thus, by way of example, 20 samples are taken of the pyrometer signals generated during each revolution. The pulse 23 represents the initial position of the turbine 10 when a first sample is taken, and each of the pulses 25 represent the positions of the turbine during the remaining 360 degrees when 19 additional samples are taken. As shown in the graph of FIG. 3, 20 samples are taken during each revolution A through M. The first sample taken at the time of pulse 23, is compared with every other sample taken at the time of pulse 23, and the sample of minimum value is selected. A similar comparison is made of the second samples during each of the A through M revolutions, and again the sample of minimum value is selected. To accomplish this, samples 1 to 20 for each of the revolutions are aligned in columns, in the ram 28. The filter 30 is programmed to select the minimum value sample from each column, so that the input to the FIFO circuit 32 is a stream of samples. The output from the FIFO 32 is, therefore, a profile of the minimum value from each columns of aligned samples.

Stated another way, after conversion to digital, the chopped signal data (the samples 1-20) acquired during a given number M of revolutions are aligned. That is, the samples acquired during the first revolution are aligned with the samples acquired during the second and each succeeding revolution, up to the Mth revolution. The data acquired during each of the M revolutions is analyzed, to determine the minimum value in each column of aligned samples. The clutter rejection filter 30 selects the minimum value acquired in each sample position measured during each revolution.

FIG. 3 shows an arbitray example of what the output of the FIFO might be in a usual case. The graph shown in FIG. 3 has a horizontal co-ordinate representing 20 samples per revolution. In a practical case, there may be 500 to 1000 samples per revolution, depending on the number of blades in the turbine. The vertical co-ordinate represents the M revolutions during which samples are taken. The X's in the chart represent the co-ordinates of the samples of minimum value, while the 0's represent samples of higher than the minimum values. Thus in the example shown, since the filter 28 is programmed to select the minimum values, the serial output to the FIFO would include, in order from 1 to 20, each of the minimum signals represented by the X's. Thus, in the arbitrary example shown in FIG. 3, the output to the FIFO would be the values of the following samples: A1, F2, D3, A4, I5, K6 ...... K20. Since these values are the minimums found during all the revolutions of the turbine, the larger noise signals are not likely to appear in the FIFO output.

The signal from each revolution is applied to a FIFO (first in first out circuit) which stores a given number of M revolutions. The next input to the FIFO replaces the oldest revolution and the process is repeated. The entire system is under the control of the CPU 34.

The turbine speed (represented by the pulses 23) and the pyrometer electrical signals are alternately sampled by the analog to digital converter 26 at a rate sufficient to insure that multiple samples per turbine blade are acquired. A relatively high sample rate (about 8 times the blade passing frequency) is needed to give a smooth (approaching continuous) representation of the turbine blade profile. Several revolutions of pyrometer data are stored in local RAM. The multiple rotations of pyrometer data are then synchronized by locating the first falling edge of the signal pulse 23 in RAM, combined with a routine utilizing a linear regression calculation of the pulse periods, also stored in RAM. Having located the starting point for each revolution of the pyrometer data, the revolutions of sampled data are then compressed. The data compression algorithm excludes single samples, at evenly spaced intervals up to the total quantity of samples taken beyond the buffer length of the FIFO. This effectively results in R revolutions, containing, for example, 20 data points of aligned data in RAM, which will be passed to the clutter rejection filter.

The clutter rejection filter then passes only the lowest value for each of the 20 points, contained in all M revolutions of data. For instance, the first point in each revolution is compared against all other first points and only the lowest is stored away in RAM, and so on up to the 20th point. Thus, the M revolutions of acquired data are reduced into one revolution of filtered data for the current sampling.

This single revolution of filtered pyrometer data is then entered into the back of a N-element circular Queue or FIFO 32 (First In First Out buffer) of previously filtered data and the Nth element is discarded. While note necessary to the invention, the data contained in the queue may then be passed through a second clutter rejection filter (not illustrated) which is identical to the previous filter 30. The output of the second filter will be a smooth temperature profile of the turbine blades, free of combustion clutter.

The required depth of the queue (N) is predetermined by the amount of expected clutter contained in the pyrometer signal. Increasing the depth improves clutter rejection, but extends the time lag of the filter as well. A deeper queue does not necessarily produce better results.

The queue depth N could be varied in response to clutter density. Time lag of the filter could thus be minimized in an adaptive fashion.

It will be clear to persons skilled in the art that the present invention is subject to various modifications and adaptations. It is intended therefore, that this invention be limited only by the appended claims as interpreted in the light of the prior art.

What is claimed is:

1. In a system for measuring the temperature of the rotating blades of a turbine in a gas turbine engine, said system including a pyrometer for generating analog electrical signals proportional to the temperature detected at said rotating turbine, said electrical signals containing both desired signals and undesired noise, a system for filtering positively biased undesired noise from said electrical signals, said filtering system comprising:
   means for generating a pulse for each of M revolutions of said turbine;
   means for continuously chopping said electrical signals between each generated pulse during said M revolutions of said turbine into a plurality of samples;
   means for aligning the samples of each of said M revolutions with the samples of the other revolutions;
   means for selecting the minimum value from each of said aligned samples; and
   means for serially storing said selected samples, said stored samples representing a profile of the temperature of said turbine blades during said M revolutions.

2. The system of claim 1, wherein said means for generating said pulses comprises a pulse generator coupled to said rotating turbine.

3. The system of claim 2, and a multiplexer to which said pulses and said signals are applied, the signal between said pulses representing the measured temperature of said blades and positively biased noise.

4. A method for measuring the temperature of the rotating blades in a gas turbine engine in the presence of positively biased noise, the steps comprising:
   generating electrical signals which are a measure of the temperature of said rotating blades and said positively biased noise;
   generating a pulse for each of M revolutions of said gas turbine engine;
   continuously chopping said electrical signals between each generated pulse during said M revolutions of said gas turbine engine into a plurality of samples;
   aligning the samples of each of said M revolutions with the samples of the other revolutions;
   selecting the minimum sample from each of said aligned samples; and
   serially storing said selected samples, said stored samples representing a profile of the temperature of said turbine blades during said M revolutions.

5. The method of claim 4, and multiplexing said pulses and said signals so that the signal between said pulses represent the measured temperature during each revolution.

6. A method for measuring the temperature of the rotating blades in a gas turbine engine in the presence of positively biased noise, comprising the steps of:
   generating an electrical signal which is a measure of the temperature of said rotating blades and said positively biased noise;
   generating a pulse for each of M revolutions of said gas turbine engine;
   chopping said electrical signal between each generated pulse during said M revolutions of said gas turbine engine into a plurality of spaced samples, whereby said samples represent the temperatures of said rotating blades and said positively biased noise measured at a number of positions equal to said plurality;
   selecting the sample of minimum value measured at each position during said M revolutions, said selected samples representing the minimum temperature of said blades at each sample position during said M revolutions.

7. The method of claim 6, and serially storing said selected samples.

* * * * *